US 8,345,855 B2

(12) United States Patent
Omiya

(10) Patent No.: US 8,345,855 B2
(45) Date of Patent: Jan. 1, 2013

(54) METHOD, DEVICE AND PROGRAM FOR CALCULATING NUMBER OF NECESSARY AGENTS

(75) Inventor: Toshiyuki Omiya, Tokyo (JP)

(73) Assignee: P & W Solutions, Co., Ltd., Tokyo (JP)

( * ) Notice: Subject to any disclaimer, the term of this patent is extended or adjusted under 35 U.S.C. 154(b) by 1267 days.

(21) Appl. No.: 12/093,445

(22) PCT Filed: Nov. 8, 2006

(86) PCT No.: PCT/JP2006/322296
§ 371 (c)(1),
(2), (4) Date: May 12, 2008

(87) PCT Pub. No.: WO2007/055250
PCT Pub. Date: May 18, 2007

(65) Prior Publication Data
US 2009/0180606 A1  Jul. 16, 2009

(30) Foreign Application Priority Data
Nov. 14, 2005 (JP) .................................. 2005-329423

(51) Int. Cl.
*H04M 3/00* (2006.01)
*H04M 5/00* (2006.01)
(52) U.S. Cl. ......... 379/265.05; 379/265.01; 379/265.02; 379/265.1
(58) Field of Classification Search ... 379/265.01–266.1
See application file for complete search history.

(56) References Cited

U.S. PATENT DOCUMENTS

| 5,185,780 | A | * | 2/1993 | Leggett | 379/265.08 |
| 5,796,791 | A | * | 8/1998 | Polcyn | 379/265.09 |
| 6,859,523 | B1 | | 2/2005 | Jilk et al. | |
| 7,769,617 | B2 | | 8/2010 | Iwasaki et al. | |
| 7,805,382 | B2 | | 9/2010 | Rosen et al. | |

FOREIGN PATENT DOCUMENTS

| JP | 2002-77250 | 3/2002 |
| JP | 2002-183386 | 6/2002 |
| JP | 2003013841 A | 1/2003 |

(Continued)

OTHER PUBLICATIONS

Bocklund, Lori et al., "Call Center Technology Demystified", Jun. 2002, ISBN 0-9709507-8-0, pp. 65-68.

(Continued)

*Primary Examiner* — Ahmad Matar
*Assistant Examiner* — Khai N Nguyen
(74) *Attorney, Agent, or Firm* — NDQ&M Watchstone LLP

(57) ABSTRACT

The optimum number of agents necessary for contact-center jobs is dynamically calculated in accordance with actual operations. A method of making the same controllable and a computer program to realize such calculation and method are provided. A necessary number-of-people calculating means (4) theoretically calculates the necessary number of people in response to the number of calls varying from time to time and average handling time ("AHT") for agents by using the well known Erlang C equation. Further, an operation-rate adjusting means (6) adjusts such theoretically calculated data of the necessary number of people by using a predicted operation data based on managers' practically experienced data and a control means (9) provides the calculated result to an output means (7).

5 Claims, 7 Drawing Sheets

FOREIGN PATENT DOCUMENTS

WO  2004004388 A1  5/2004

OTHER PUBLICATIONS

Chiaki Hishinuma, "Theoretical Study of the Connectability of Contact Centers", http://www.teu.ac.jp/hishi/erlang/kaisetsu2.pdf (abstract).

Gans, Noah et al., "Commissioned Paper: Telephone Call Centers: Tutorial, Review, and Research Prospects", Manufacturing & Service Operations Management, Spring 2003, vol. 5, No. 2, pp. 79-141, especially pp. 92-93, Retrieved from the Internet: http://www.callcentres.net/CALLCENTRES/LIVE/Resources/Documents/TelephoneCallCenters.pdf.

Office Action issued to U.S. Appl. No. 12/375,666, mailed Sep. 29, 2011, pp. 1-12.

English abstract for JP2003013841, retrieved on Dec. 29, 2011, p. 1.

English abstract for WO2004040388, retrieved on Dec. 29, 2011, p. 1.

* cited by examiner

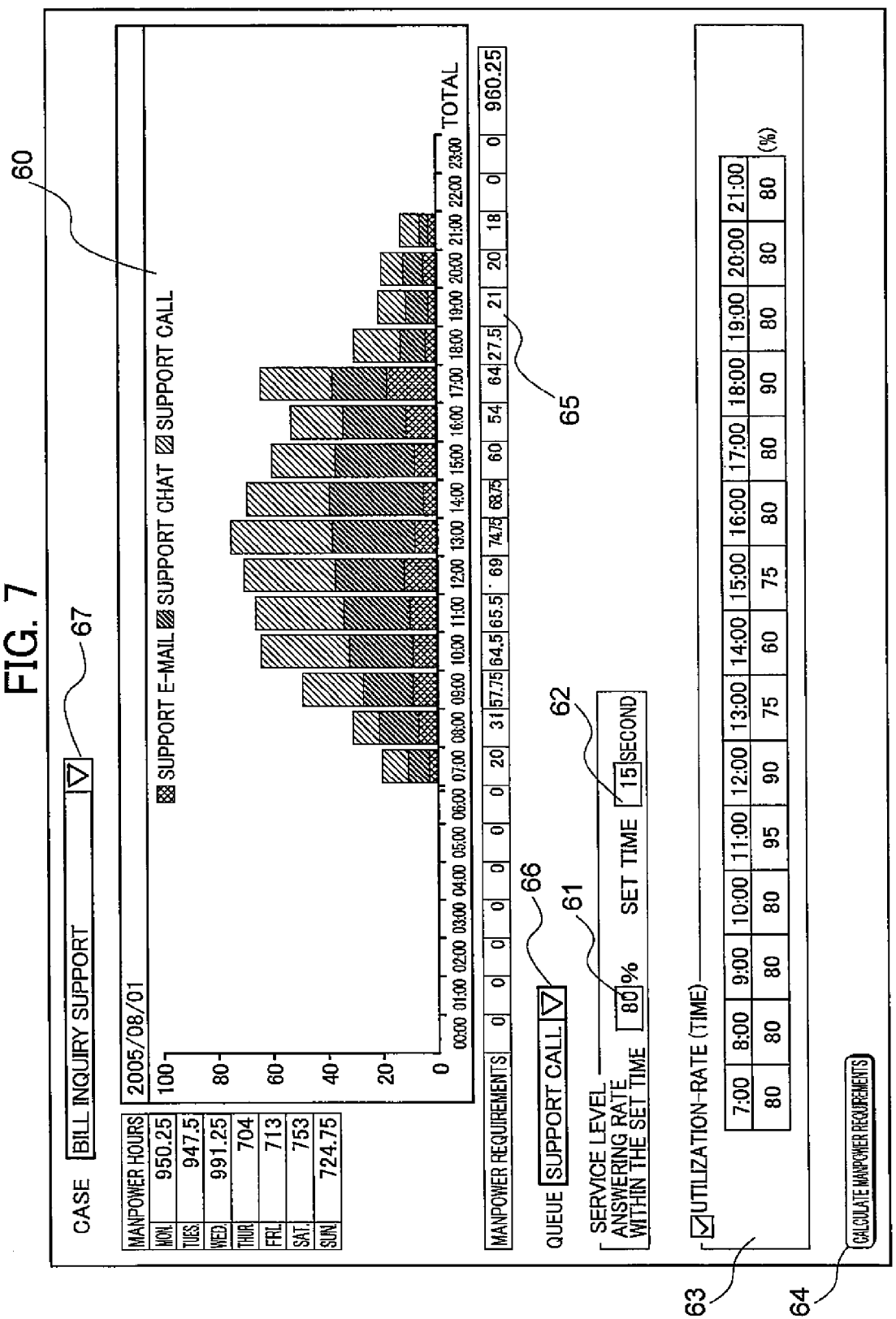

METHOD, DEVICE AND PROGRAM FOR CALCULATING NUMBER OF NECESSARY AGENTS

CROSS REFERENCE TO RELATED APPLICATIONS

This application is a U.S. national phase application based on International Application No. PCT/JP2006/322296 entitled, "Method, Device and Program for Calculating Number of Necessary Agents," filed on Nov. 8, 2006, which was not published in English, which is based on and claims the benefit of priority under 35 U.S.C. §119 from Japanese Patent Application No. 2005-329423, filed on Nov. 14, 2005.

TECHNICAL FIELD

The present invention relates to a method, a device, and a program for calculating a number of necessary agents, particularly to a method and a device for calculating manpower requirements for agents in a contact center, and a computer program for implementing the same.

BACKGROUND ART

In recent years, a contact center (also known as a call center) as a support call desk for customers has been occupying an important position in companies. In particular, the ease of receiving an answer from a contact center is very important for improving customer satisfaction. If customers call a contact center many times but do not get any answer because the number is always busy, this phenomenon will lead to losing a large number of customers and business opportunities.

Consequently, an attempt is being made in which "the ease of receiving an answer" from the contact center is being studied, improved, and optimized. For example, in Japanese Unexamined Patent Application Publication No. 2002-77250, a network facility data capacity calculating apparatus and the like are disclosed in which traffic theory is adapted to combine data volumes for each application program for calculating an optimal amount of facility data capacity. In addition, http://www.teu.ac.jp/hishi/erlang/kaisetsu2.pdf, a method and the like are disclosed in which for a traffic problem of a contact center, the numbers of external lines and extensions and the seating capacity of agents and the number of seats for agents are calculated based on a traffic intensity, a lost-call rate, patient time, and the like.

DISCLOSURE OF THE INVENTION

Problems to be Solved by the Invention

In the method disclosed in Japanese Unexamined Patent Application Publication No. 2002-77250, manpower requirements for agents (also referred to as operators, or communicators) are not a subject for optimization. In addition, in Japanese Unexamined Patent Application Publication No. 2002-77250, the theoretical value of manpower requirements is determined based on the parameters described above, but it may be impossible to apply this theoretical value under actual operational environments. Manpower requirements have to be determined as they are matched with the traffic intensity (a number of calls) which changes every moment, and it is necessary to adjust human factors, such as the utilization rate of agents, on the basis of an administrator's empirical rules, and manpower requirements need to be decided, taking into consideration factors such as a factor of at which level the service level for customers is to be set.

The present invention, in order to solve the problems described above, has an object of providing a method which theoretically calculates optimal manpower requirements for agents matched with services in a contact center under actual operations, as well as allowing the value to be adjusted on the basis of empirical rules, and providing a computer program which implements the same.

Means for Solving the Problems

Specifically, in the present invention, the following solutions are provided.

(1) A method for calculating manpower requirements for agents in a contact center, the method comprising the steps of: accepting a traffic intensity per unit time and an average processing time of the agents as input parameters (for example, Step S200 shown in FIG. 3); based on the input parameters, calculating a probability that a call needs to wait for service, using the Erlang C formula (for example, Step S206 shown in FIG. 3); based on the probability that a call needs to wait for service, calculating an answering rate within a set time as a service level (for example, Step S208 shown in FIG. 3); repeating the step of calculating the probability that a call needs to wait for service (for example, Step S206 shown in FIG. 3) and the step of calculating the answering rate within a set time in a recurring manner, thus calculating manpower requirements for satisfying a predetermined service level (for example, Steps S210 and S212 shown in FIG. 3); inputting a predicted utilization rate of agents by an administrator (for example, Step S300 shown in FIG. 5); and based on the service level and the predicted utilization rate, re-calculating manpower requirements (for example, Step S302 shown in FIG. 5).

According to the invention described in (1), the publicly-known Erlang C formula is used to theoretically calculate manpower requirements according to the traffic intensity varying depending on time periods and the average processing time of agents (AHT: Average Handling Time). Furthermore, the theoretical value of the calculated manpower requirements is adjusted by using a predicted utilization rate on the basis of administrator's empirical rules actually experienced. This adjustment may be performed in units of days, or it may be performed for every time period. In addition, it may be performed in units of agent services, or in units of teams. Accordingly, highly accurate manpower requirements for agents can be determined, which are matched with the actual operational situations of a contact center.

(2) The method described in (1), wherein a predetermined set time is further added as the input parameter, and S, which is the answering rate within a set time, is calculated by the following equation (for example, Step S208 shown in FIG. 3).

$$S = 1 - M \times e^{\{(a-c) \times t / AHT\}}$$

Here, c is the number of agents, a is the total traffic intensity per unit time =traffic intensity per unit time×AHT, t is the set time, and M is the probability that a call needs to wait for service (determined by the Erlang C formula).

According to the invention described in (2), the answering rate within a set time is specifically defined as the service level (SLA: Service Level Agreement), and this answering rate is a criterion for calculating manpower requirements for agents. Thus, a target service level is reflected in manpower requirements, and consequently, manpower requirements for improving customer satisfaction can be determined.

(3) The method described in (1), wherein the predicted utilization rate is inputted by an administrator for each of at least one of a day, a time period, a campaign, or an agent group (for example, the types of services indicated by queue menu 66 shown in FIG. 7).

According to the invention described in (3), the predicted utilization rate can be specified not only in units of days but also for every time period, every campaign (operation), and every agent group (agent team), and thus, highly accurate manpower requirements can be determined.

(4) A manpower requirements calculation device calculating manpower requirements for agents in a contact center, the device comprising: an input unit for accepting a traffic intensity per unit time and an average processing time of the agents as input parameters (for example, a parameter input unit 1 shown in FIG. 1); based on the input parameters, a probability computing unit for calculating a probability that a call needs to wait for service, using the Erlang C formula (for example, a probability computing unit 2 shown in FIG. 1); based on the probability that a call needs to wait for service, an SLA calculation unit for calculating an answering rate within a set time as a service level (for example, an SLA calculation unit 3 shown in FIG. 1); a manpower requirements calculation unit for repeating the probability computing unit and the SLA calculation unit in a recurring manner for determining manpower requirements (for example, a manpower requirements calculation unit 4 shown in FIG. 1); a utilization rate input unit for inputting a predicted utilization rate of agents by an administrator (for example, a utilization rate input unit 5 shown in FIG. 1); and based on the service level and the predicted utilization rate, a utilization rate adjustment unit for re-calculating manpower requirements determined by the manpower requirements calculation unit (for example, a utilization rate adjustment unit 6 shown in FIG. 1).

According to the invention described in (4), by operating this device, an effect similar to the invention described in (1) can be expected.

(5) A computer program calculating manpower requirements for agents in a contact center, the program allowing a computer to execute the steps of: accepting a traffic intensity per unit time and an average processing time of the agents as input parameters (for example, Step S200 shown in FIG. 3); based on the input parameters, calculating a probability that a call needs to wait for service, using the Erlang C formula (for example, Step S206 shown in FIG. 3); based on the probability that a call needs to wait for service, calculating an answering rate within a set time as a service level (for example, Step S208 shown in FIG. 3); repeating the step of calculating the probability that a call needs to wait for service and the step of calculating the answering rate within a set time in a recurring manner, thus calculating manpower requirements (for example, Steps S210 and S212 shown in FIG. 3); inputting a predicted utilization rate of agents by an administrator (for example, Step S300 shown in FIG. 5); and based on the service level and the predicted utilization rate, re-calculating manpower requirements (for example, Step S302 shown in FIG. 5).

According to the invention described in (5), a computer is allowed to execute this computer program, whereby an effect similar to that of the invention described in (1) can be expected.

(6) A recording medium on which the computer program described in (5) is recorded.

According to the invention described in (6), this recording medium is inserted into a computer to execute the program, whereby an effect similar to that of the invention described in (1) or (2) can be expected.

Effect of the Invention

According to the present invention, based on a service level, manpower requirements matched with actual services in a contact center can be calculated. In addition, adjustments using a utilization rate based on an administrator's empirical values can be added, whereby highly accurate predictions can be made.

BRIEF DESCRIPTION OF THE DRAWINGS

FIG. 7 shows a diagram depicting an example of a screen output according to an example of a preferred embodiment of the present invention.

PREFERRED MODE FOR CARRYING OUT THE INVENTION

Hereinafter, an embodiment of the present invention is described based on implementations with reference to the drawings.

Figure 1:
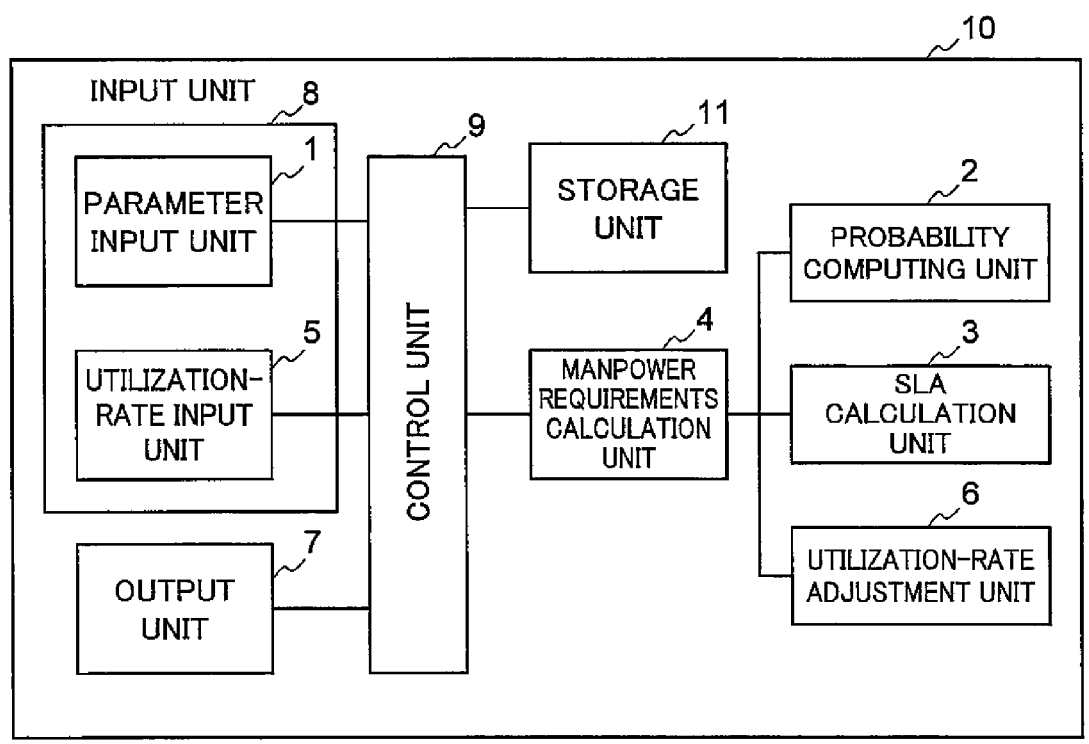
FIG. 1 shows a diagram depicting a device functional block according to an example of a preferred embodiment of the present invention.

FIG. 1 shows a diagram schematically depicting a functional block of a manpower requirements calculation device 10 according to an example of a preferred embodiment of the present invention. The manpower requirements calculation device 10 is configured of a control unit 9, a storage unit 11, an input unit 8, an output unit 7, a manpower requirements calculation unit 4, a probability computing unit 2, an SLA calculation unit 3, and a utilization rate adjustment unit 6. Then, the control unit 9 accepts an input from the input unit 8, allows the manpower requirements calculation unit 4 to calculate manpower requirements, and then displays the result as a number on the output unit 7. Moreover, the control unit 9 accepts an input of a utilization rate from the input unit 8, further allows the utilization rate adjustment unit 6 to adjust calculated manpower requirements, and outputs the number to the output unit 7.

The control unit 9 is an information processor (CPU: Central Processing Unit) which computes and processes information and controls the manpower requirements calculation device 10 overall. The control unit 9 reads and executes various programs stored in the storage unit 11, as necessary, to cooperate with the hardware described above and to implement various functions according to the present invention.

The storage unit 11 may include a local memory used for executing the programs in combination with the control unit 9, a large capacity bulk memory, and a cache memory used for efficiently searching the bulk memory. Then, the storage unit 11 stores various programs executed by the control unit 9. For the computer readable medium that implements the storage unit 11 (recording medium), media that electrically, magnetically, optically, and electromagnetically implement the storage unit 11 may be included. More specifically, included are a semiconductor memory device, a magnetic tape, a magnetic disk, a random-access memory (RAM), a read-only memory (ROM), and an optical disk including a CD-ROM, a CD-R/W, and a DVD.

The input unit 8 further includes a parameter input unit 1 and a utilization rate input unit 5. The parameter input unit 1 is a means for inputting a parameter by an administrator to allow the manpower requirements calculation device 10 to calculate manpower requirements, and the utilization rate input unit 5 is a means for inputting a utilization rate by the administrator referring to the value outputted to the output unit 7 for the calculated manpower requirements. The input unit 8 including these units is a means for accepting an input by the administrator and the like, which may include a keyboard, a pointing device, and the like. The input unit 8 can be directly connected to the manpower requirements calculation device 10, or through an I/O controller.

The output unit 7 is a means for displaying a screen on which an input of data is accepted for the administrator, and a screen of the result of the computing process by the control unit 9, which may include a display device such as a cathode-ray tube (CRT), a liquid crystal display device (LCD), and the like. The manpower requirements calculation unit 4 calculates manpower requirements for agents in a contact center.

The manpower requirements calculation unit 4 calculates manpower requirements in cooperation with the probability computing unit 2, the SLA calculation unit 3, and the utilization rate adjustment unit 6. Then, the manpower requirements calculation unit 4 requests as needed a parameter and the like necessary to calculate manpower requirements from the control unit 9, and passes the value of the parameter and the like to the probability computing unit 2, the SLA calculation unit 3, and the utilization rate adjustment unit 6.

The probability computing unit 2 calculates a lost-call rate (B) and a probability (M) that a call needs to wait for service, described later, and the SLA calculation unit 3 calculates an answering rate (S) within a set time, and the utilization rate adjustment unit 6 performs a manpower requirements adjustment process based on the utilization rate. Here, the term SLA indicates a target service level. The service level (the answering rate within a set time) shows the ratio of calls answered within a preset time by percentage.

In order to calculate manpower requirements for agents in a contact center, first, the control unit 9 accepts input of necessary parameters through the parameter input unit 1. The necessary parameters are at least the total traffic intensity per unit time (a), the set time (t), and the AHT (Average Handling Time). The total traffic intensity per unit time may be accepted through input by the administrator. Alternatively, for example, the total traffic intensity per unit time may be used for calculation in such a way that ACD (Average Call Distribution) statistical data of the past traffic intensity and the like are stored in the storage unit 11, and the control unit 9 accepts a specified input of a predetermined date and time from the stored ACD statistical data by the administrator, and then the total traffic intensity per unit time is read out of the storage unit 11 for use in calculation. Alternatively, the total traffic intensity per unit time may be calculated in such a way that data about the traffic intensity per unit time and the AHT stored in the storage unit 11 are read, and the traffic intensity per unit time is multiplied by the AHT.

Figure 2:
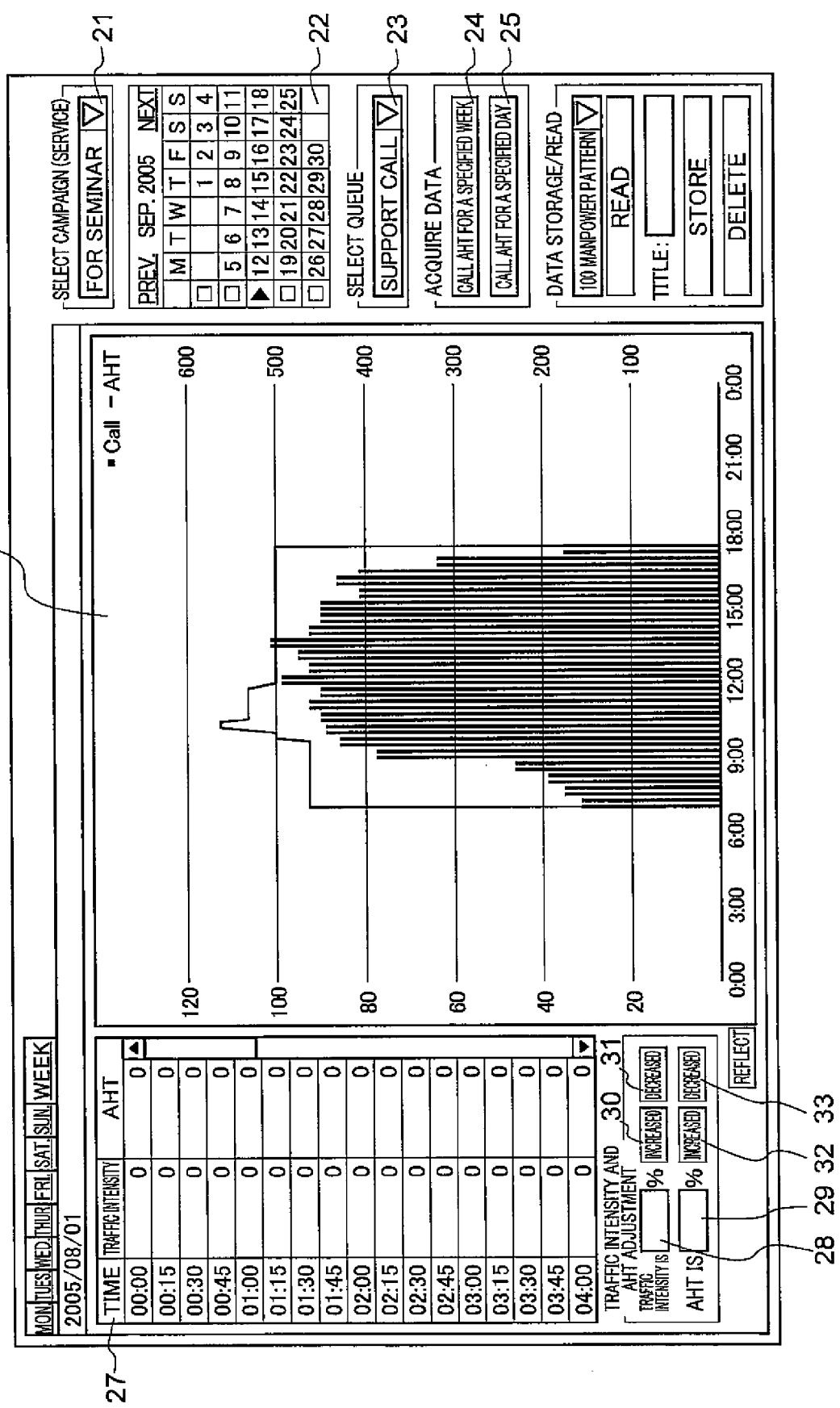
FIG. 2 shows a diagram depicting an example of a screen output according to an example of a preferred embodiment of the present invention.

In a case of determining a total traffic intensity per unit time from past statistical data, for example, the control unit 9 allows the output unit 7 to display a screen shown in FIG. 2, and accepts an input from the administrator for determination. In FIG. 2, first, the administrator selects an operation for which the traffic intensity is desired to be calculated from a campaign (operation) selection menu 21 by the input unit 8, and selects a corresponding date or week from a calendar 22. For example, a service under administration, such as "telephone," "mail," and the like, may be selected from a selection menu 23 to calculate a traffic intensity for every service under administration. Then, an administrator selects button 24 or 25, and then the control unit 9 accepts this, and reads statistical data of traffic intensity on the specified week or date out of the storage unit 11, and displays the statistical data on the output unit 7. Specifically, for example, as shown in a graph 26, traffic intensity per unit time on a specified date may be displayed. In addition, in a case in which weekly data is read, an average traffic intensity of a week per unit time may be displayed. Then, the control unit 9 shows numerical values of traffic intensity and AHT on a table 27. Here, in order to calculate manpower requirements for agents for a scheduled service, an administrator inputs numerical values in input boxes 28 and 29, and selects buttons 30, 31, 32 and 33 to adjust the traffic intensity and the AHT in the displayed statistical data. Then, each time at which the control unit 9 accepts an input from the administrator through the input unit 8, the control unit 9 changes values on the graph 26 and the table 27, and outputs the values to the output unit 7. As described above, by past ACD statistical data about the traffic intensity being stored, it can be easier than if the administrator simply inputs values for the control unit 9 to calculate a tendency such as a movement of a long term traffic intensity and incorporate it in values.

The control unit 9 accepts an input of parameters, and then the control unit 9 passes the accepted parameters to the manpower requirements calculation unit 4. Then, the manpower requirements calculation unit 4 receives the parameters and starts calculating manpower requirements for agents. First, the probability computing unit 2 calculates the lost-call rate (B). The term lost-call rate (B) is the ratio of the lost traffic intensity to the input traffic intensity. In other words, it is the ratio of calls that tried to make a call but failed because of some effects (a customer made a call but a line was busy), and it is a numerical value indicating ease of receiving an answer for customers. The lost-call rate (B) is calculated by the following recurrence equation (Equation 1).

$$\begin{cases} E_n(a) = \dfrac{aE_{n-1}(a)}{n + aE_{n-1}(a)} \\ E_0(a) = 1 \end{cases} \quad \text{(Equation 1: Erlang B formula)}$$

Here, $n$ is an integer.

In the equation above, a is a total traffic intensity per unit time, given by:

a=traffic intensity per unit time×AHT.

Subsequently, the probability computing unit 2 substitutes the lost-call rate (B) determined from the equation above into Equation 2 below, and calculates the probability (M) that a call needs to wait for service.

$$M = \frac{cE_c(a)}{c - a + aE_c(a)} \quad \text{(Equation 2: the Erlang C formula)}$$

Here, c represents a manpower requirement for agents to be calculated. The method for determining c will be described later.

The probability computing unit 2 calculates the probability (M) that a call needs to wait for service from Equation 2, and then passes the calculated value to the SLA calculation unit 3.

The SLA calculation unit 3 receives the value of the probability (M) that a call needs to wait for service, and calculates the answering rate (S) within the set time. The term answering rate within a set time is the ratio of calls that are answered within a predetermined set time. The SLA calculation unit 3 uses the following equation to calculate the answering rate (S) within the set time.

$$S = 1 - M \times e^{\{(a-c) \times t/AHT\}} \quad \text{(Equation 3)}$$

Here, t is a set time that is inputted by the administrator in advance and is a value that is accepted by the control unit 9. Then, the calculated answering rate within the set time (S) indicates the ratio of calls that can be answered within a set time in a case of a certain number of agents.

The SLA calculation unit 3 calculates the answering rate (S) within the set time, and then the manpower requirements calculation unit 4 receives the value and compares it with the demanded answering rate. The demanded answering rate is a value that is inputted by the administrator in advance and accepted by the control unit 9. If a calculated answering rate (S) within the set time is greater than a demanded answering rate, this means that the number of agents used for calculation is unable to satisfy the demanded answering rate. Thus, the number of agents is additionally incremented by one, and then the answering rate (S) within the set time is repeatedly calculated until the answering rate (S) within the set time is smaller than the demanded answering rate, using Equations 1 to 3. Then, if the calculated answering rate (S) within the set time becomes smaller than the demanded answering rate, the number of agents used for calculation satisfies the demanded answering rate, and then the number of agents is the theoretical manpower requirement.

Subsequently, the manpower requirement is adjusted depending on a utilization rate. Here, the term utilization rate is the ratio, for all of the assigned agents, of agents that are actually able to work on assigned services. Even though the agents are assigned to services, they may not always be able to work on the assigned services all the time. For example, the reason is that such time periods sometimes occur in which agents attend a meeting or training, or take a break and the like, and these are time periods in which agents are involved with activities other than agents' services under administration. In addition to the above, not all of these time periods, such as routine meetings, training and breaks, can always be known in advance. Some agents may need to attend an unexpected meeting or to deal with customers, failures, and the like, or a different amount of time may be spent depending on the assigned agents. For example, an agent assigned to a leader is highly likely to deal with a sudden customer, or attend a meeting. As described above, for the utilization rate, which is highly likely to change continually, by adjusting manpower requirements on the basis of an administrator's empirical rules, there is a possibility to calculate more highly accurate manpower requirements for agents by correcting the value theoretically calculated with the manpower requirements calculation device 10.

The utilization rate adjustment unit 6 uses the following equation to adjust the calculated manpower requirement based on the utilization rate.

$$\text{manpower requirements} = \frac{\text{the calculated manpower requirements calculated using Eqn. 3}}{\text{the utilization rate}/100} \quad \text{(Eqn. 4)}$$

Here, the utilization rate may be based on such a premise that the utilization rate is inputted by the administrator in advance through the utilization rate input unit 5 and is accepted by the control unit 9. Alternatively, the utilization rate may be accepted in such a way that the SLA calculation unit 3 calculates the answering rate within a set time, the control unit 9 outputs the value to the output unit 7, and the administrator confirms the value and inputs the utilization rate through the utilization rate input unit 5.

Then, the utilization rate adjustment unit 6 similarly adjusts the value each time that the control unit 9 receives an input that changes the utilization rate.

Figure 3:
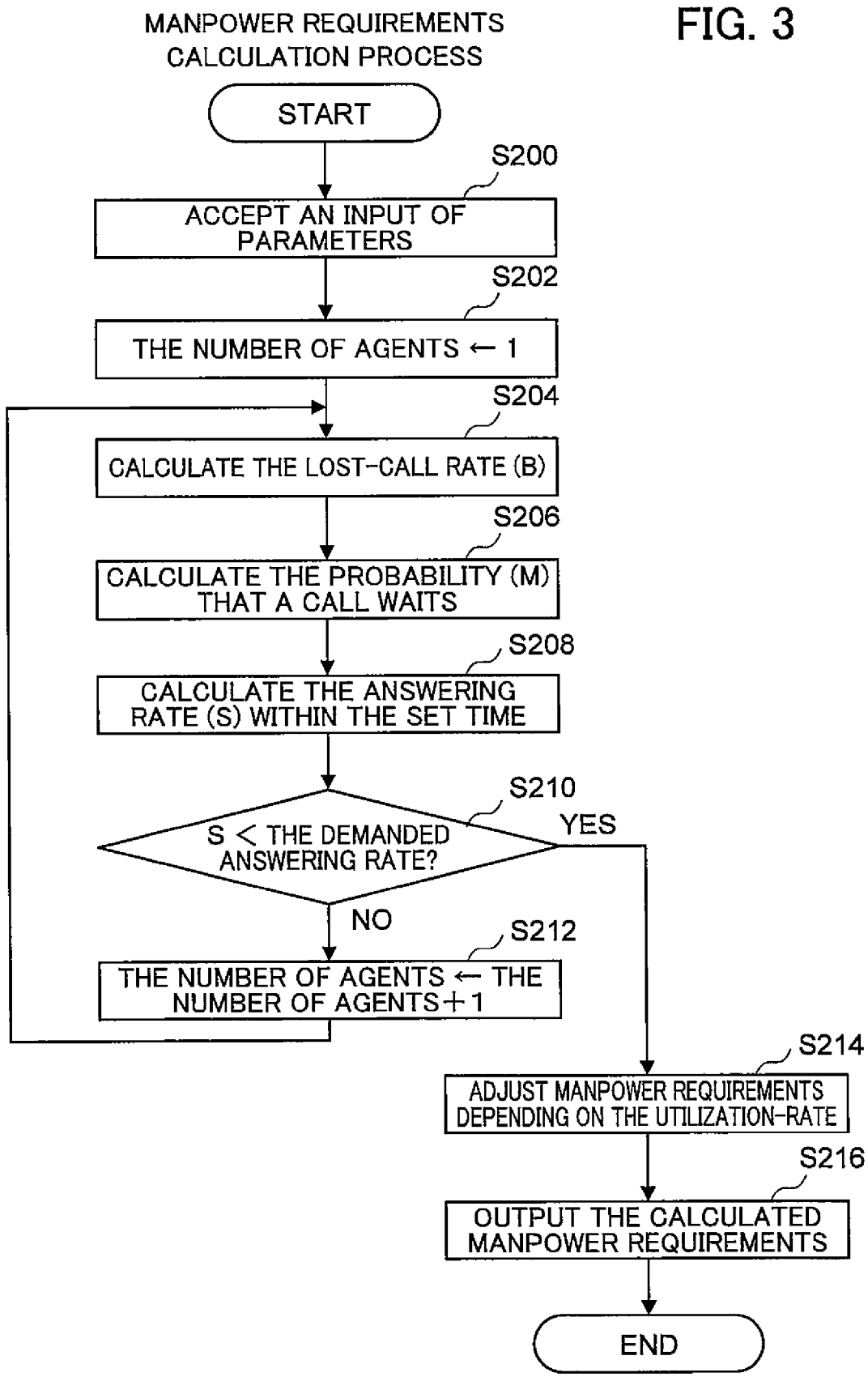
FIG. 3 shows a flow chart depicting a manpower requirements calculation process according to an example of a preferred embodiment of the present invention.

FIG. 3 shows a flow depicting the manpower requirements calculation process described above.

In Step S200, the control unit 9 accepts an input of parameters necessary to calculate manpower requirements through the parameter input unit 1. For example, the parameters necessary to calculate manpower requirements are the set time, the number of agents, the demanded answering rate, the traffic intensity per unit time, and the like. In addition, the control unit 9 may read the traffic intensity per unit time from past statistical data and the like stored in the storage unit 11. When this process finishes, the process proceeds to Step S202.

In Step S202, the control unit 9 passes the accepted parameters to the manpower requirements calculation unit 4, and the manpower requirements calculation unit 4 passes at least the value of the traffic intensity per unit time and the number of agents among the received parameters to the probability computing unit 2. In addition, if an input of a value of a number of agents has not been accepted as a parameter, the value of the number of agents is considered to be one, and the value is sent to the probability computing unit 2. When this process finishes, the process proceeds to Step S204.

In Step S204, the probability computing unit 2 uses Equation 1 to calculate a lost-call rate (B). The probability computing unit 2 uses Equation 2 further to calculate a probability (M) that a call needs to wait for service from a calculated lost-call rate (B), and sends the calculated value to the manpower requirements calculation unit 4 (Step S206). When this process finishes, the process proceeds to Step S208.

In Step S208, the manpower requirements calculation unit 4 receives the probability (M) that a call needs to wait for service from the probability computing unit 2, and passes the demanded answering rate received from the control unit 9, together with the value, to the SLA calculation unit 3, and the SLA calculation unit 3 calculates an answering rate (S) within the set time. The SLA calculation unit 3 uses, in calculating, the probability (M) that a call needs to wait for service received from the manpower requirements calculation unit 4, the demanded answering rate, and Equation 3. When this process finishes, the process proceeds to Step S210.

In Step S210, the SLA calculation unit 3 determines whether the value (S) calculated in Step S208 is smaller than the value of the demanded answering rate received from the manpower requirements calculation unit 4. If this determination is NO, the process proceeds to Step S212, whereas if this determination is YES, the process proceeds to Step S214.

In Step S212, the manpower requirements calculation unit 4 increments the number of agents by one, and then the process returns to Step S204. This means that since the number of agents used for calculations so far (Step S204 to Step S208) has not achieved the demanded answering rate, the number of agents is increased and re-calculated. As described above, the number of agents is increased incrementally to repeat calculation until the number of agents achieves the demanded answering rate (until the answering rate (S) within the set time becomes smaller than the demanded answering rate).

In Step S214, the SLA calculation unit 3 passes the calculated answering rate (S) within the set time to the manpower requirements calculation unit 4, and the manpower requirements calculation unit 4, having received the answering rate (S) within the set time, further passes the values of the calculated manpower requirements for agents, the utilization rate and the like, and the information on calculation units to the utilization rate adjustment unit 6, and the utilization rate adjustment unit 6 receives these and adjusts manpower requirements depending on the utilization rate. The details of this process will be described later. In a case where this process is finished, the utilization rate adjustment unit 6 passes the calculated result to the control unit 9 through the manpower requirements calculation unit 4, and the control unit 9, having received the manpower requirements, outputs the calculated result of the manpower requirements to the output unit 7 (Step S216), and then all the processes are finished.

Figure 4:
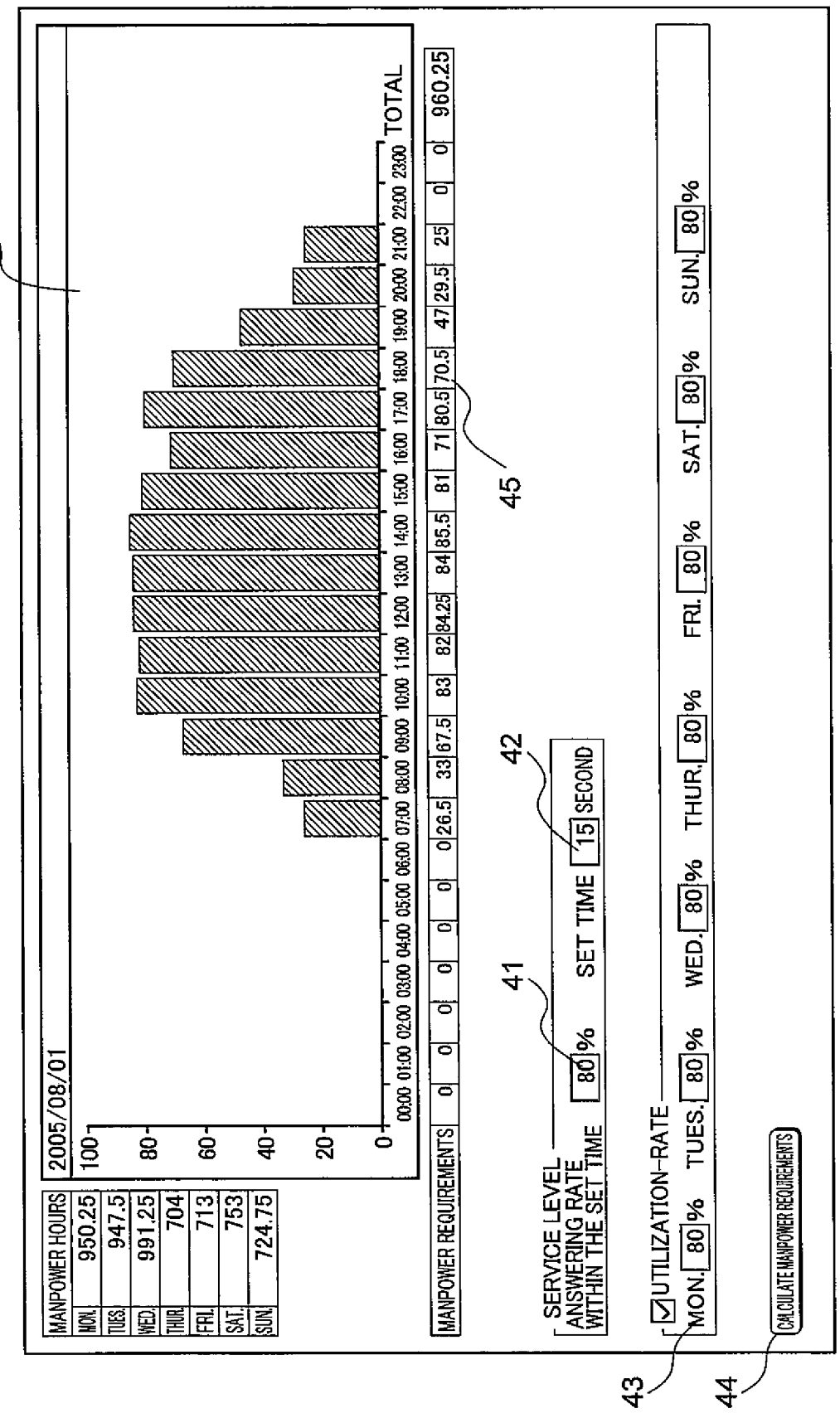
FIG. 4 shows a diagram depicting an example of an output according to an example of a preferred embodiment of the present invention.

In addition, as an example of output, FIG. 4 shows an example of an output screen. In FIG. 4, a graph 40 depicts a calculated result of manpower requirements per unit time, and a table 45 below the graph indicates specific numerical values. In addition, on the screen shown in FIG. 4, columns are provided to input an answering rate within a set time 41, a set time 42, and a utilization rate 43, these values are inputted, and a manpower requirements calculation button 44 is selected, whereby manpower requirements are re-calculated. Moreover, for the values of an answering rate within a set time 41, a set time 42, and a utilization rate 43, a default value may be adapted in a case in which a specific value is not inputted.

Figure 5:
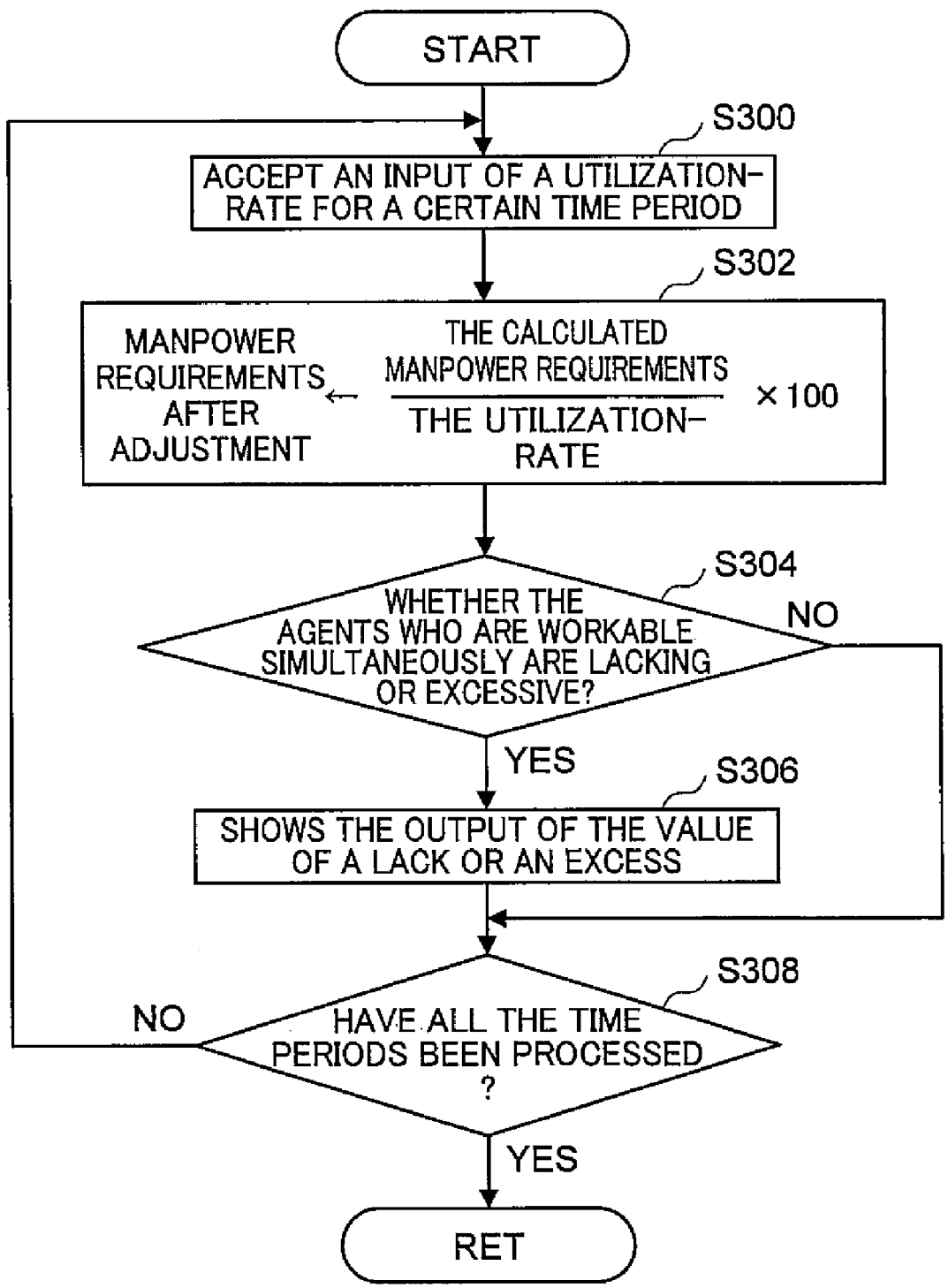
FIG. 5 shows a flow chart depicting an adjustment process depending on the utilization rate, according to an example of a preferred embodiment of the present invention.

FIG. 5 shows a diagram depicting a process of adjusting manpower requirements depending on a utilization rate, according to an example of a preferred embodiment of the present invention as an example of Step S214 shown in FIG. 3. The process of adjusting manpower requirements depending on a utilization rate can be performed in predetermined units. For example, units may be in days or time periods, or may be services, agent teams, or a combination of these. Hereinafter, this discussion will proceed for a case in which manpower requirements are adjusted depending on a utilization rate in units of time periods.

In Step S300, a control unit 9 accepts an input by an administrator of a utilization rate for a certain time period through a utilization rate input unit 5. Then, the control unit 9 sends the value of the accepted utilization rate to the utilization rate adjustment unit 6 through the manpower requirements calculation unit 4.

In Step S302, the utilization rate adjustment unit 6 receives the value of the utilization rate, uses the values of the calculated manpower requirements and the utilization rate received from the manpower requirements calculation unit 4 to calculate manpower requirements after adjustment with Equation 4, and passes the calculated value to the manpower requirements calculation unit 4. When this process finishes, the process proceeds to Step S304.

In Step S304, the manpower requirements calculation unit 4 determines whether the number of agents who are workable simultaneously are insufficient for manpower requirements. Specifically, for example, the manpower requirements calculation unit 4 receives the value of the number of agents who are workable simultaneously from the control unit 9, and subtracts the value of manpower requirements after adjustment that has been calculated in Step S302 from the value of the number of agents who are workable simultaneously. The number of agents who are workable simultaneously is the maximum number of agents who are workable simultaneously in a certain time unit. For example, it can be a seating capacity and the like of agents in a contact center. As a result of subtraction, if the value is a negative number, this determination is YES, whereas if the value is a positive number, this determination is NO. If this determination is YES, the process proceeds to Step S306, whereas if this determination is NO, the process proceeds to Step S308.

In Step S306, the manpower requirements calculation unit 4 passes the value of a lack in a number of agents who are workable simultaneously for manpower requirements to the control unit 9, and the control unit 9 outputs the value of the lack to the output unit 7. In addition, this output may be outputted after all the time periods have been processed. In this case, the value of a lack in manpower is temporarily stored in storage unit 11 by way of control unit 9.

Figure 6:
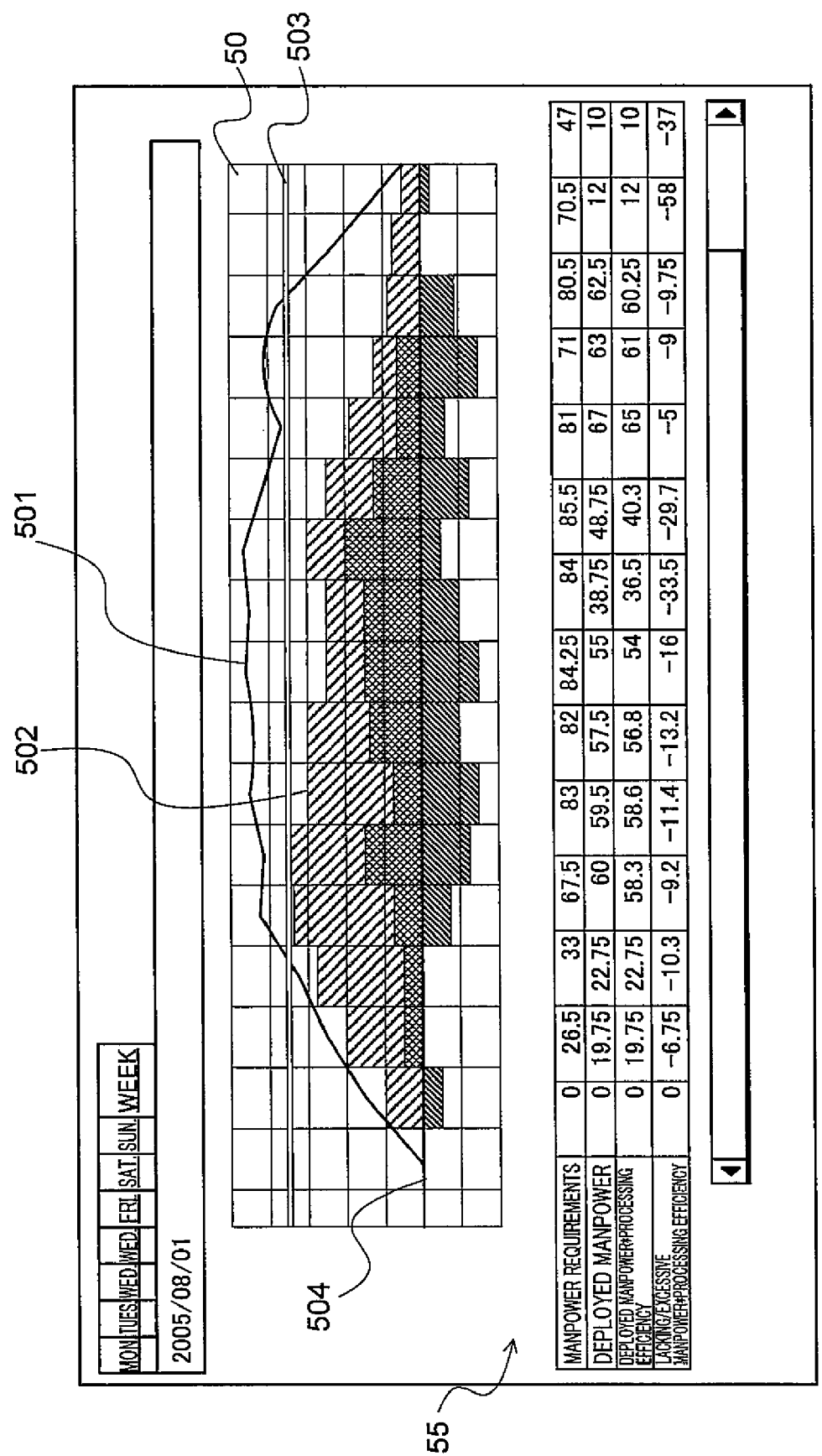
FIG. 6 shows a diagram depicting an example of a screen output according to an example of a preferred embodiment of the present invention.

FIG. 6 shows an example of an output screen for a value of a lack/excess in manpower. In FIG. 6, a graph 50 and a table 55 are shown. The graph 50 is configured of a line graph 501 depicting manpower requirements per unit time, a bar graph 502 depicting a value representing deployed manpower currently being assigned, and a line 503 depicting a number of agents who are workable simultaneously. Then, the horizontal axis 504 indicates an origin, and the portion depicted below the origin by the bar graph 502 indicates a value representing a lack in manpower. Then, the table 55 shows the specific numerical values corresponding to the individual bar graphs.

In addition, the numerical value representing a lack in manpower shown in table 55 may be a value that have been adjusted by processing efficiency of services done by agents, as shown in FIG. 5. For example, the processing efficiency is a numerical value indicating a ratio of processing efficiency performed by a certain agent, where the average processing efficiency of services done by agents is 100. Processing efficiency of agents is taken into account, whereby manpower requirements matched with a workload of required services can be scheduled. Specifically, for example, in a case in which a value representing a lack in manpower is five people, five people may not always process an actual workload for services. The reason is that the level of ability of processing services may be different depending on the agent. In a case in which there are services requiring 300 processes where the average processing efficiency of agents is 100, three agents whose processing efficiency is 100 are required, whereas two agents whose processing efficiency is 150 are enough for the processes. In addition, in contrast to this, since new employees, for example, may be inexperienced with services, in a case in which two new agents are included whose processing efficiency is 50, if two other agents whose processing efficiency is 100 and those two agents whose processing efficiency is 50 are used together, then a total of four agents would be required for this job. As described above, by including processing efficiency in the parameters, it is possible to ascertain manpower requirements for actual processing services.

Again referring to FIG. 5, in Step S308, the manpower requirements calculation unit 4 determines whether all time periods have been processed. If this determination is NO, the process returns to Step S300 to adjust manpower requirements based on utilization rates in different time periods. In addition, if this determination is YES, the process is finished, and the process proceeds to Step S216 shown in FIG. 3.

FIG. 7 shows an example of an output screen for a value representing a lack in manpower. Similarly to in FIG. 4, in FIG. 7, a graph 60 depicts a calculated result of manpower requirements per unit time, and a table 65 below the graph depicts specific numerical values. This graph 60 shows manpower requirements for every type of service under administration. The type of service under administration is selected through the queue menu 66 in calculating manpower requirements for every the type of service under administration. Moreover, for example, by changing a selection though a case menu 67, manpower requirements may be calculated for every case, such as "bill inquiry support," "customer support," and the like. On the screen shown in FIG. 7, there are columns to input an answering rate within the set time 41, a set time 62, and a utilization rate 63. By inputting these values and selecting a manpower requirements calculation button 64, manpower requirements are re-calculated. The utilization rate 63 shows time periods in which manpower requirements are not zero for the date currently indicated by the graph 60, so that utilization rates with different time units can be inputted. In addition, for the values of an answering rate within a set time 61, a set time 62, and a utilization rate 63, a default value may be adapted for cases in which a specific value has not been inputted.

As discussed above, the embodiment of the present invention has been described, but only specific examples have been exemplified, which do not restrict the present invention in any particular manner. In addition, the effects described in the embodiment of the present invention simply list the most preferable effects derived from the present invention, and the effects of the present invention are not restricted to the effects described in the embodiment of the present invention.

What is claimed:

1. A method for calculating manpower requirements for agents in a contact center, the method comprising the steps of:
accepting, at a processor, a traffic intensity per unit time and an average processing time of the agents as input parameters;
calculating, at a processor, based on the input parameters, a probability that a call needs to wait for service, using the Erlang C formula;
calculating, at a processor, responsive to the probability that a call needs to wait for service, an answering rate within a set time as a service level;
repeating the step of calculating the probability that a call needs to wait for service and the step of calculating the answering rate within a set time in a recurring manner, thus calculating manpower requirements for satisfying a predetermined service level;
inputting, to a processor, a predicted utilization rate of agents by an administrator; and
re-calculating, at a processor, responsive to the service level and the predicted utilization rate, manpower requirements,
wherein the predicted utilization rate of agents is based on empirical rules possessed by the administrator.

2. A method for calculating manpower requirements for agents in a contact center, the method comprising the steps of:
accepting, at a processor, a traffic intensity per unit time and an average processing time of the agents as input parameters;
calculating, at a processor, based on the input parameters, a probability that a call needs to wait for service, using the Erlang C formula;
calculating, at a processor, responsive to the probability that a call needs to wait for service, an answering rate within a set time as a service level;
repeating the step of calculating the probability that a call needs to wait for service and the step of calculating the answering rate within a set time in a recurring manner, thus calculating manpower requirements for satisfying a predetermined service level;
inputting, to a processor, a predicted utilization rate of agents by an administrator; and
re-calculating, at a processor, responsive to the service level and the predicted utilization rate, manpower requirements,
wherein a predetermined set time is further added as an input parameter, and S, which is the answering rate within a set time, is calculated by the following equation:

$$S = 1 - M \times e^{((a-c) \times t/AHT)}$$

wherein,
AHT is Average Handling Time,
c is the number of agents,
a is the total traffic intensity per unit time=traffic intensity per unit time × AHT,
t is the set time, and
M is the probability that a call needs to wait for service (determined by the Erlang C formula).

3. The method according to claim 1, wherein the inputting, to a processor, the predicted utilization rate is performed by the administrator for at least one of: a day, a time period, a campaign, or an agent group.

4. A manpower requirements calculation device calculating manpower requirements for agents in a contact center, the device comprising:
an input unit for accepting a traffic intensity per unit time and an average processing time of the agents as input parameters;
a probability computing unit responsive to the input parameters, for calculating a probability that a call needs to wait for service, using the Erlang C formula;
an Service Level Agreement (SLA) calculation unit responsive to the probability that a call needs to wait for service, for calculating an answering rate within a set time as a service level;
a manpower requirements calculation unit for causing the probability computing unit and the SLA calculation unit to perform in a recurring manner for determining manpower requirements;
a utilization rate input unit for inputting a predicted utilization rate of agents by an administrator; and
a utilization rate adjustment unit responsive to the service level and the predicted utilization rate, for re-calculating manpower requirements determined by the manpower requirements calculation unit,
wherein the predicted utilization rate of agents is based on empirical rules possessed by the administrator.

5. A non-transitory recording medium storing a computer program calculating manpower requirements for agents in a contact center, the program causing a processor to execute the steps of:
- accepting a traffic intensity per unit time and an average processing time of the agents as input parameters;
- calculating, responsive to the input parameters, a probability that a call needs to wait for service, using the Erlang C formula;
- calculating, responsive to the probability that a call needs to wait for service, an answering rate within a set time as a service level;
- repeating the step of calculating the probability that a call needs to wait for service and the step of calculating the answering rate within a set time in a recurring manner, thus calculating manpower requirements;
- inputting a predicted utilization rate of agents by an administrator; and
- re-calculating, responsive to the service level and the predicted utilization rate, manpower requirements,
- wherein the predicted utilization rate of agents is based on empirical rules possessed by the administrator.

* * * * *